United States Patent [19]

Inoko

[11] Patent Number: 4,679,685
[45] Date of Patent: Jul. 14, 1987

[54] ACCUMULATING COMMODITY CONVEYOR

[75] Inventor: Kenji Inoko, Shiga, Japan

[73] Assignee: AB Tetra Pak, Lund, Sweden

[21] Appl. No.: 556,647

[22] Filed: Nov. 30, 1983

[51] Int. Cl.⁴ .............................................. B65G 47/31
[52] U.S. Cl. .................................... 198/461; 198/429; 198/623
[58] Field of Search ............... 198/419, 462, 628, 779, 198/461, 572, 627, 626, 579, 623, 429, 430, 468.1, 468.11, 457

[56] References Cited

U.S. PATENT DOCUMENTS

| | | | |
|---|---|---|---|
| 1,215,596 | 2/1917 | Wescott | 198/779 |
| 2,316,654 | 4/1943 | Stover | 198/628 |
| 2,768,756 | 10/1956 | Horman | 198/419 |
| 3,224,549 | 12/1965 | Cella et al. | 198/419 |
| 3,407,916 | 10/1968 | Engeler | 198/626 |
| 3,550,789 | 12/1970 | Jaeger et al. | 198/430 |
| 3,624,773 | 11/1971 | Krooss | 198/626 |
| 3,800,935 | 4/1974 | Montgomery | 198/572 |
| 3,905,488 | 9/1975 | Larson et al. | 198/419 |
| 3,978,969 | 9/1976 | Williams et al. | 198/461 |
| 3,990,566 | 11/1976 | Nordqvist | 198/419 |
| 4,073,375 | 2/1978 | Hart et al. | 198/572 |
| 4,084,685 | 4/1978 | Hollenton et al. | 198/461 |
| 4,157,408 | 6/1979 | Lingl | 198/419 |
| 4,173,278 | 11/1979 | Reitter | 198/461 |
| 4,178,120 | 12/1979 | Weichhand | 198/419 |
| 4,230,218 | 10/1980 | Kunzmann | 198/461 |
| 4,274,532 | 6/1981 | Johnson | 198/461 |
| 4,360,098 | 11/1982 | Nordstrom | 198/579 |
| 4,364,466 | 12/1982 | Mojden | 198/459 |

FOREIGN PATENT DOCUMENTS

| | | | |
|---|---|---|---|
| 2129089 | 1/1972 | Fed. Rep. of Germany | 198/627 |
| 2204635 | 8/1973 | Fed. Rep. of Germany | 198/461 |
| 2538646 | 3/1977 | Fed. Rep. of Germany | 198/626 |
| 2916794 | 11/1979 | Fed. Rep. of Germany | 198/461 |
| 31771 | 3/1980 | Japan | 198/462 |
| 471020 | 5/1969 | Switzerland | 198/779 |
| 654617 | 6/1951 | United Kingdom | 198/626 |
| 768686 | 2/1957 | United Kingdom | 198/626 |
| 2111010 | 6/1983 | United Kingdom | 198/779 |

Primary Examiner—Joseph E. Valenza
Attorney, Agent, or Firm—Koda and Androlia

[57] ABSTRACT

This invention is a commodity conveyor for use with an accumulating device wherein a pusher pushes box-shaped commodities off the conveyor in a perpendicular direction onto a second conveyor. The present invention provides a constant commodity flow rate, with individual commodities travelling at a fixed distance from each other, so that accumulation of the commodities can be made automatically. In one embodiment, the second conveyor includes a pair of endless chains connected by parallel cylindrical rollers. The speed of the pusher and the second conveyor are kept equal. In a second embodiment, sets of pairs of endless vertical belts are provided on either side of the commodity conveyor, gripping the individual commodities. With one set of belts travelling below conveyor speed, and another set travelling exactly at the same speed as the conveyor speed, it is possible to obtain the desired constant commodity flow rate and constant separation distance between commodities. Additional pushers can accumulate the commodities into a collecting container, and further, push them out of the container.

1 Claim, 13 Drawing Figures

ACCUMULATING COMMODITY CONVEYOR

BACKGROUND OF THE INVENTION

1. Field of the Invention

The present invention relates to a commodity conveyor used with an accumulating device.

2. Prior Art

It has been frequently found that in order to collect a plurality of commodities in one container, they are successively (1) conveyed by a conveyor, (2) pushed off the conveyor by a pusher operating perpendicular to the conveying direction and, (3) accumulated and pushed into the collecting container by another pusher.

In this system, some commodities in a box-shape travel so close to each other that they fall over and end up in a disorderly pile, and others are so distant from each other that the conveying becomes random. If such condition occurs, it is impossible to push the commodities off conveyor at a uniform rate by the pusher, in which case the subsequent commodity accumulation cannot be automated.

SUMMARY OF THE INVENTION

The present invention is a commodity conveying device capable of maintaining a constant distance between a commodity and its follower, when conveying a great number of, typically box-shaped, comodities. This is achieved by providing perpendicular to the first conveyor a second conveyor whose speed is matched to that of the pusher which pushes the commodities off the first conveyor.

DETAILED DESCRIPTION OF THE INVENTION

In one embodiment of the invention, a second conveyor 3, placed perpendicular to the first conveyor 1, comprises a pair of endless chains connected by a plurality of rotatable circular cylinders, or rollers, in parallel, and travels at the same speed as that of the pusher which pushes the commodities off the first conveyor. As shown in FIGS. 1 through 5, commodities A are conveyed in the direction of the arrows by conveyor 1 and, when they reach the location of a stop 4, the leading commodity and the following commodities are intercepted by the stop 4. At this moment, a pusher 2 for pushing the commodity off the conveyor commences to be actuated in the direction of the arrow in FIG. 1 so that the commodities intercepted at this side of the stop 4 are pushed off onto conveyor C provided perpendicular to the conveyor 1.

Figure 2:
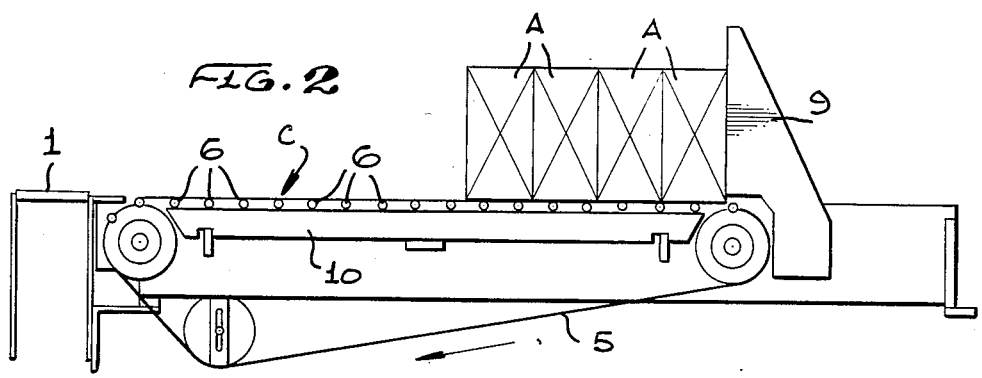
FIG. 2 is a partial longitudinal sectional front view of FIG. 1.
Figure 4:
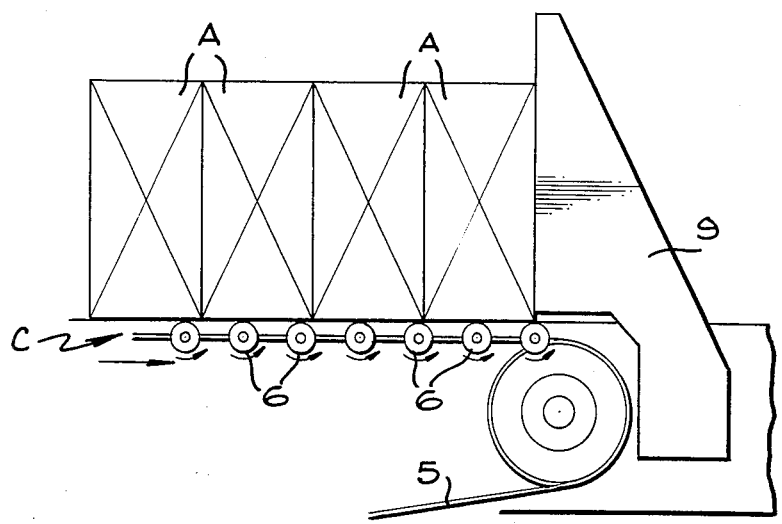
FIG. 4 is a partial longitudinal sectional enlarged front view to clarify FIG. 2.

The conveyor C is designed to travel in the direction of the arrows of FIGS. 2 and 4 and to attain a travelling speed identical to the speed of the pusher 2; more specifically, the conveyer travels at the final speed of the pusher 2 when it completes pushing the commodity off conveyor 1. In this way, the commodity A pushed off by the pusher 2 does not turn over when it is transmitted to the conveyor C.

Figure 1:
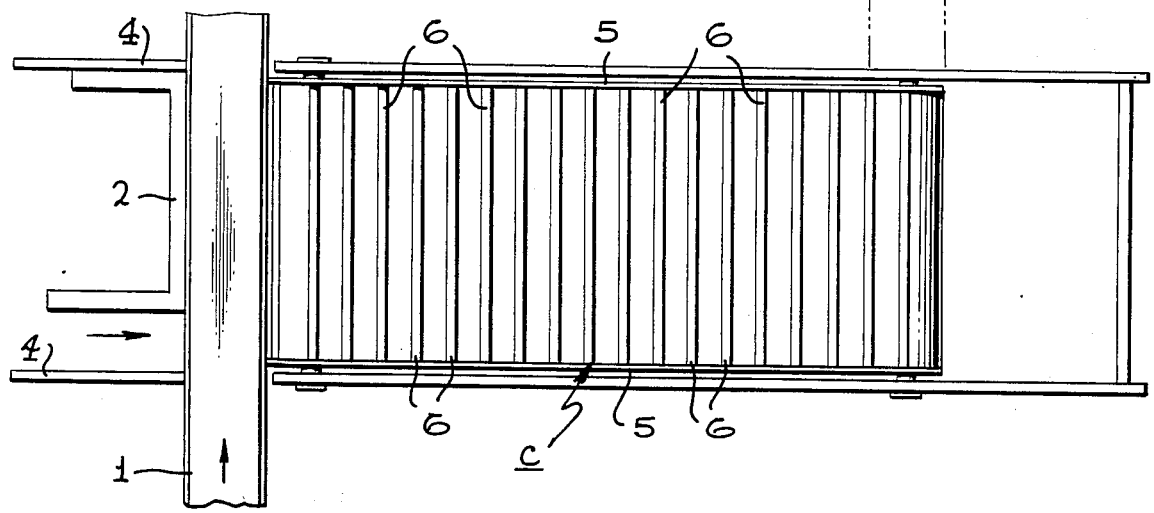
FIG. 1 is a plan view showing one embodiment of the present invention.
Figure 3:
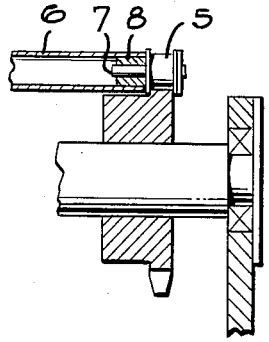
FIG. 3 is a partial longitudinal sectional side view detail of FIG. 2.

As shown in FIG. 1, the conveyor C adopts the structure in which a plurality of circular rollers 6 in parallel are connected rotatably across a pair of left and right chains 5 and 5, separated by a suitable distance. One way to make the rollers 6 rotatable between chains 5 and 5 is shown in FIG. 3, where a pin 7 is cantilevered from the chain 5, and the end of the roller 6 is mounted around it through a bearing 8.

In FIGS. 2 and 4, a stop 9 is provided on the front edge (right edge in the drawings) of the conveyor C, intercepting the commodity A which has been conveyed by the advance move of the conveyor C. In that case, the conveyor C, that is, the chains 5 and 5 continue to be driven in the direction of the arrow in FIGS. 2 and 4, so that an advancing force is naturally exerted on the commodity A situated on the conveyor C. The present device avoids applying an extreme amount of force to the commodity A intercepted by stop 9 which would cause commodity A to be indented because of the mitigating effect of rotation of the rollers 6 in the direction of the arrows in FIG. 4. In FIG. 2, a guide 10 is provided just under the chain 5, which is adapted to be able to travel on the guide 10.

According to the present invention, making the pushing-off speed of the pusher 2 pushing the commodity A at the equal travelling speed of the conveyor C avoids tumbling of commodity A pushed off the conveyor 1 by the pusher 2 when commodity A is transmitted to the conveyor C, resulting in elimination of trouble during the subsequent accumulation. Furthermore, since commodity A which has been transmitted to the conveyor C is located on the rotatable rollers 6, stop 9 may intercept the commodities but without an extreme amount of force so that commodity A is not damaged.

Figure 5:
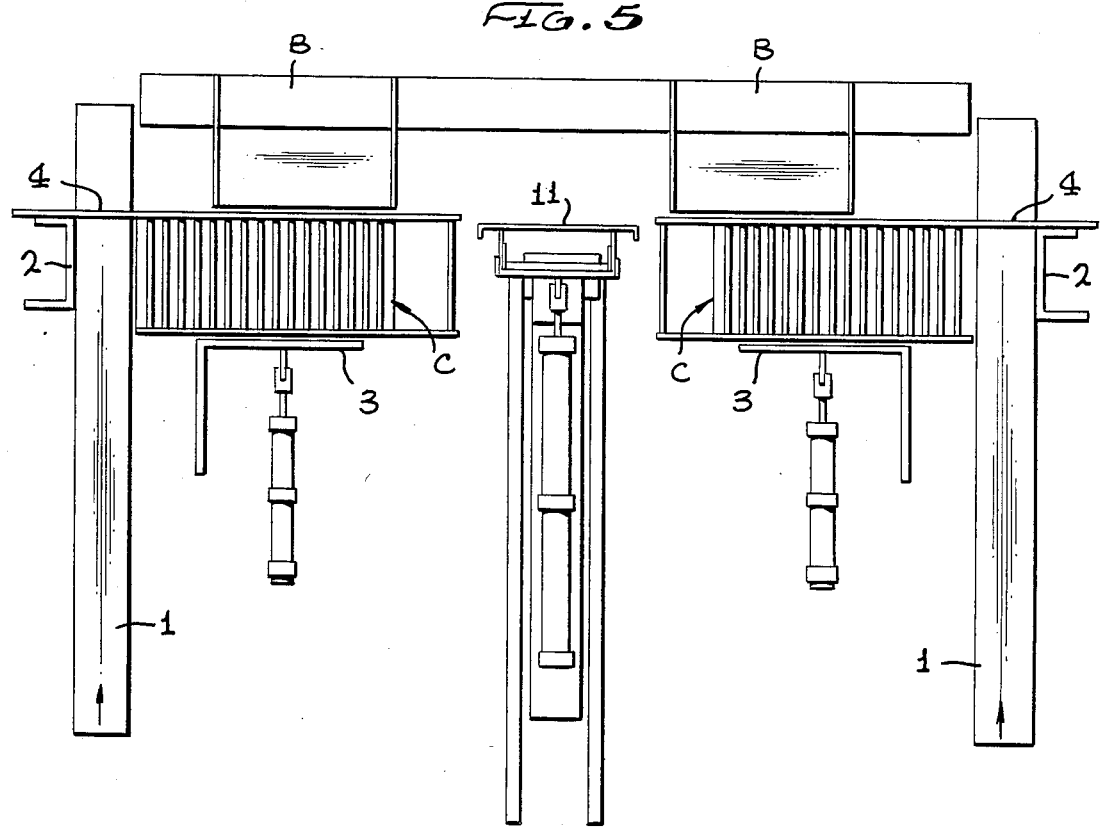
FIG. 5 is a schematic plan view of the entire accumulating commodity conveyor.

In FIG. 5, a centrally located pusher 11 in front of conveyor C is used for pushing out a plurality of commodities from container B. Disposed symmetrical about the pusher 11 are assemblies comprising conveyor 1, pushers 2 and 3, stop 4 and conveyor C. The same operations are performed in both assemblies, and the two containers B and B are alternately moved in front of the pusher 11, so that a desired number of commodities can be efficiently accumulated and pushed out.

Another embodiment of the present invention will now be described in conjunction with FIGS. 6 through 13.

Figure 6:
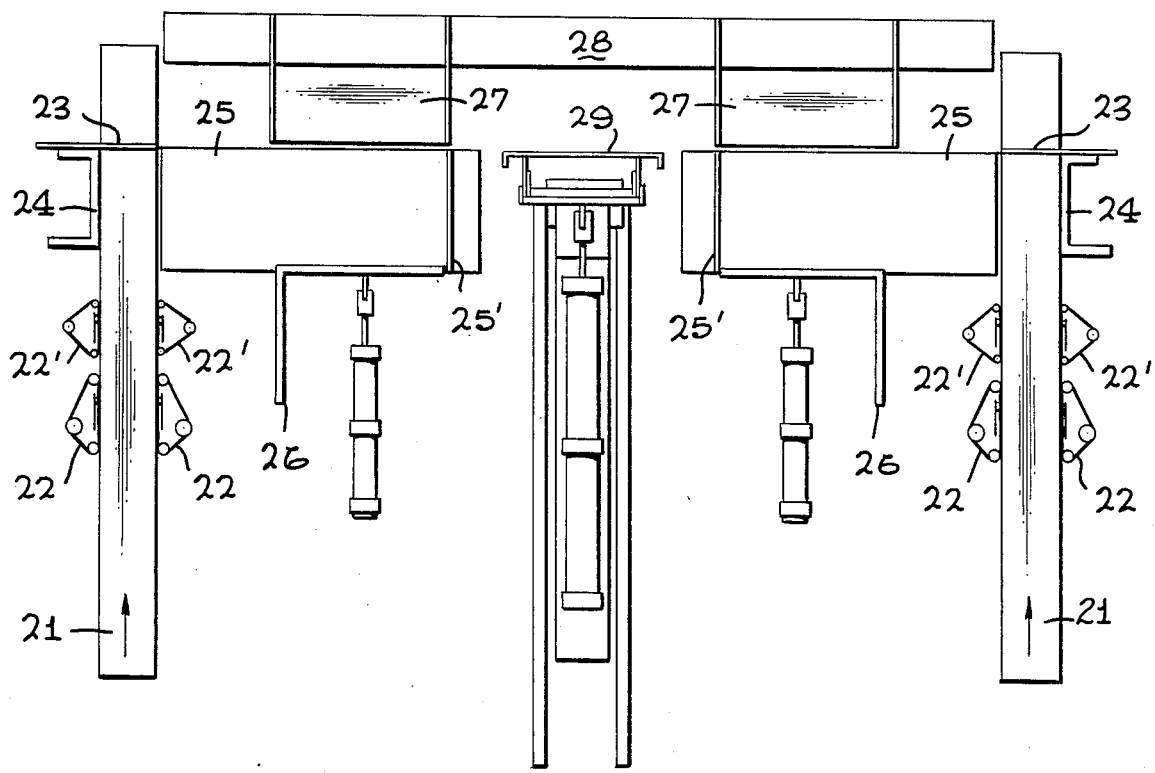
FIG. 6 is a plan view of a different embodiment of an entire accumulating commodity conveyor.
Figure 7:
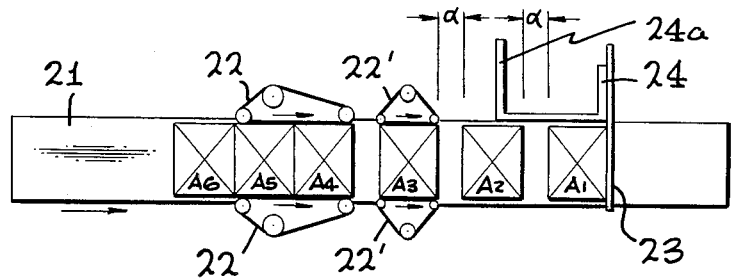
FIGS. 7, 8 and 9 are plan views to illustrate the sequential operation of the commodity conveying device.

As shown in FIG. 6, on the both sides of the conveyor 21 which travels at a constant speed, a plurality of vertical belts 22 and 22' are provided. These vertical belts 22 and 22' are designed to travel at the same speed as or at a lower speed than the travelling speed of the conveyor 21. This design permits, as shown in FIG. 7, the commodities conveyed by the conveyor 21 to be held at a desired speed by one group of vertical belts 22 and 22' such as reducing their speed below that of the conveyor, or accelerating the conveyor at a higher speed than these vertical belts 22 and 22'. Once the commodities separate from the vertical belts 22 and 22', the constant distance a between the successive commodities in a flow of commodities $A_1$, $A_2$ and $A_3$ . . . is maintained.

Figure 8:
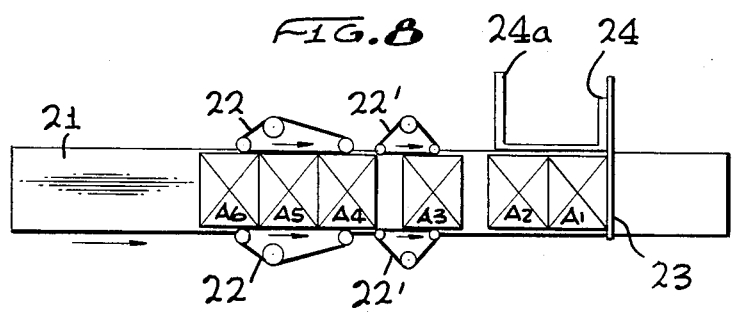
Figure 9:
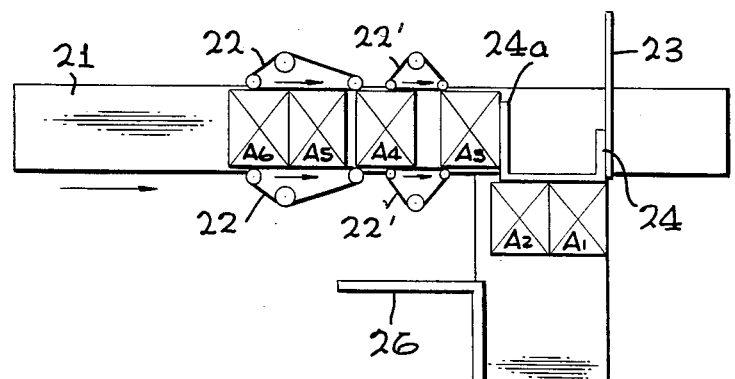
Figure 10:
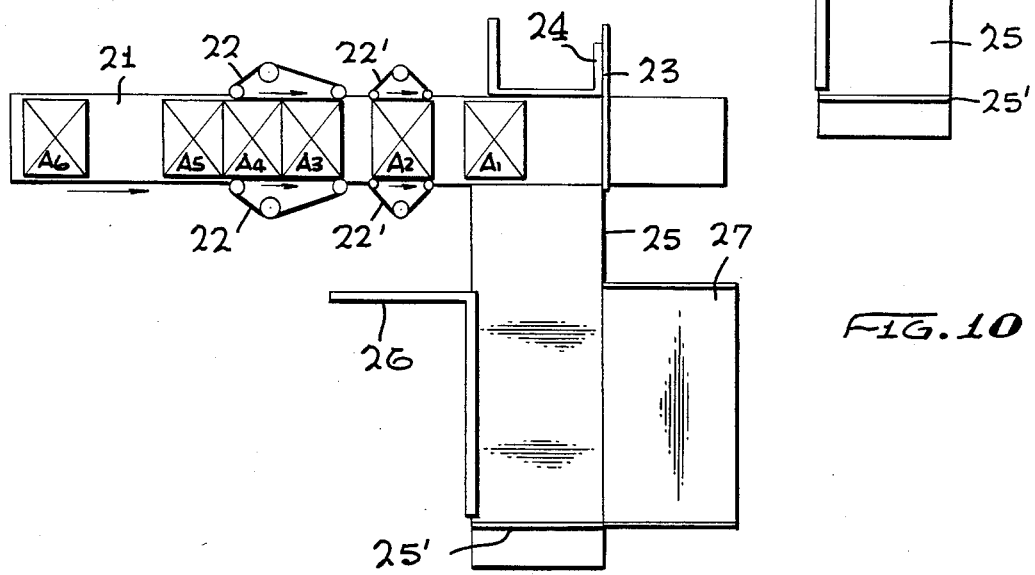
FIGS. 10, 11, 12 and 13 are plan views to illustrate the sequential operation of the entire accumulating commodity conveyor of FIG. 6.
Figure 11:
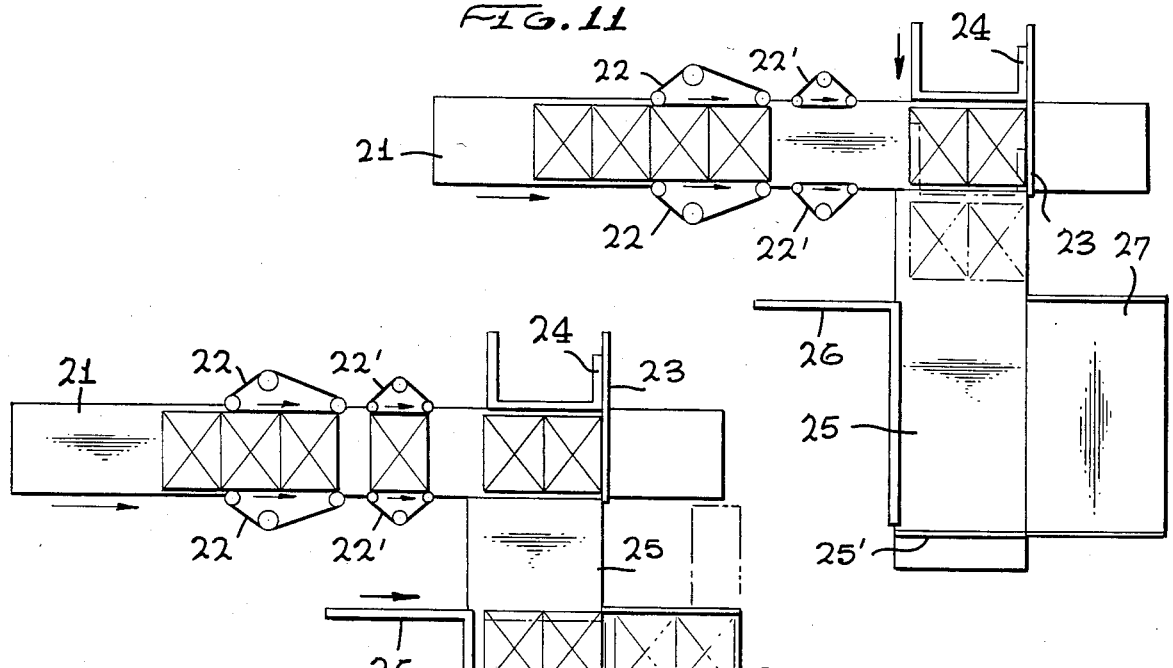
Figure 12:
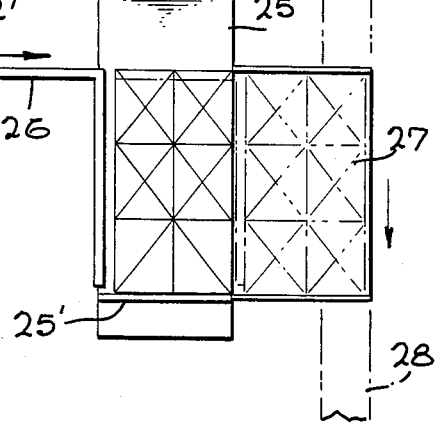

The commodities further advance separated by this constant distance, and when they reach the stop 23 provided in front of the conveyor 21, as shown in FIG. 8, the leading commodity $A_1$ and the next commodity $A_2$ are intercepted by the stop 23. At this moment, the pusher 24 provided next to the stop 23 commences to be actuated in the direction of the arrow in FIG. 8 and pushes off the commodities $A_1$ and $A_2$ onto conveyor 25 perpendicular to the conveyor 21 as seen in FIG. 9. When the pusher 24 is located as shown in FIG. 9, the conveyor 21 continues travelling and advancing the subsequent commodity $A_3$ which is, however, intercepted by an impeding plate 24a provided on one side of the pusher 24 so that as soon as the pusher 24 is retracted, the commodity $A_3$ starts to advance without hesitation to reach at the stop 23. Then, as soon as commodity $A_4$ is in contact with the commodity $A_3$, the pusher 24 is again actuated, pushing off both commodities $A_3$ and $A_4$ onto the conveyor 25.

In this embodiment, other vertical belts 22' and 22' which are provided just aft of vertical belts 22 and 22 are designed to travel at a speed identical to the travelling speed of the conveyor 21. In such an arrangement vertical belts 22' and 22' accelerate the commodity, which was previously decelerated by the vertical belts 22 and 22. For this reason, the commodity, once it is caused to stop, is in a position to respond instantaneously to the speed of the conveyor 21 and does not fall over.

According to another embodiment of the present invention, the commodities which are successively fed are first decelerated by a group of vertical belts 22 and 22'. When the commodities get away from the vertical belts 22 and 22', they are accelerated by the conveyor 21 travelling faster than the vertical belts 22 and 22' so that a constant distance a is maintained between the leading article and its follower. In addition, the flow rate of the commodities becomes constant.

Therefore, since the commodities successively fed do not contact with each other, no excessive force (the so-called line pressure) due to the advance of the commodities on the conveyor 21 is exerted upon the pusher 24, and the pusher 24 actuates smoothly. Furthermore, the constant flow rate of the articles on the conveyor 21 prevents the commodities from being caught in the pusher 24 which is controlled so that the articles are not pushed over.

In order to maintain a constant distance between the front and rear commodity, it may be required to stop the vertical belts 22 and 22' temporarily, in which case there is a limit to the feeding speed of the commodities as well as the feeding amount and to the working efficiency. From that veiw point, the present invention adopts the system working with constant speed in the vertical belts 22 and 22' without any temporary stopping so that the above-mentioned disadvantage is eliminated.

Figure 13:
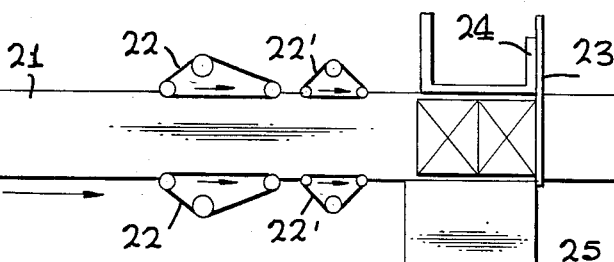
Figure 13:
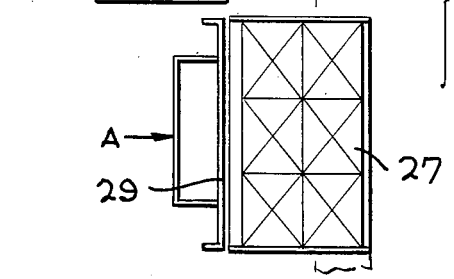

Following the repetition of the foregoing operation, the desired number of the commodities (specifically six pieces in FIGS. 10 through 13) are accumulated on the conveyor 25 by means of the stop 25' provided on the front upper part of the conveyor 25. These commodities are pushed in one operation into container 27 located at the side of the conveyor 25 by another pusher 26 which is actuated perpendicular to conveyor 25. After that, the container 27 commences to travel on a rail 28 provided parallel to the conveyor 25. When it reaches a position diagonally in front of the conveyor 25, another pusher 29 is actuated in the direction of arrow A of FIG. 13 to push out the commodities from the container 27. By repeating the foregoing operation, the desired number of commodities can be successively pushed out at a removal port in front of the pusher 29 which is shown in FIG. 13.

As shown in FIG. 6, assemblies comprising conveyor 21, vertical belts 22 and 22', stop 23, pusher 24, conveyor 25, stop 25' and pusher 26 are symmetrically disposed on either side of the pusher 29. The same operations are performed in both assemblies and the two containers 27 and 27 are alternately moved in front of pusher 29 so that the desired number of articles can be efficiently accumulated and pushed out.

I claim:

1. A commodity conveying device incorporated into an accumulating device comprising:

a first conveyor forwarding commodities at a constant speed;

a second conveyor contiguous and perpendicular to said first conveyor, said second conveyor comprising a plurality of rotatable circular cylinders arranged in parallel to be connected at each end to one of a pair of identical endless chains;

a pusher in reciprocating motion which pushes said commodities off said first conveyor in a perpendicular direction onto said second conveyor; and means for synchronizing the motions of said commodities, second conveyor, and said pusher so as to provide a constant flow rate of commodities whereby each commodity is separated from each other by a constant distance on said second conveyor, and for futher controlling the push off speed of said pusher to be equal to the speed of said second conveyor thereby avoiding any tumbling or damage to said commodities and eliminating problems during subsequent accumulation, said synchronizing means comprising sets of pairs of endless vertical belts disposed on either side of said first conveyor with adjustable inter-belt distance and capable of gripping said commodities, with one of said belt pair set travelling at a speed lower than that of said first conveyor, and the other of said belt pair set travelling at a speed equal to that of said first conveyor, the combined effect providing desired constant commodity flow rate and constant distance of separation.

* * * * *